United States Patent
Schmidt et al.

(10) Patent No.: US 7,052,628 B2
(45) Date of Patent: May 30, 2006

(54) TRANSITION METAL CARBOXYLATES AS CATALYSTS FOR OXYGEN SCAVENGING

(75) Inventors: Richard P. Schmidt, The Woodlands, TX (US); James A. Solis, Groves, TX (US); Ta Yen Ching, Houston, TX (US)

(73) Assignee: Chevron Phillips Chemical Company, LP, The Woodlands, TX (US)

(*) Notice: Subject to any disclaimer, the term of this patent is extended or adjusted under 35 U.S.C. 154(b) by 101 days.

(21) Appl. No.: 10/717,297

(22) Filed: Nov. 19, 2003

(65) Prior Publication Data

US 2005/0104033 A1    May 19, 2005

(51) Int. Cl.
C09K 15/34 (2006.01)
C08K 5/098 (2006.01)
C11B 5/00 (2006.01)

(52) U.S. Cl. .............................. 252/188.28; 252/181.3; 252/181.4

(58) Field of Classification Search ............ 252/188.28
See application file for complete search history.

(56) References Cited

U.S. PATENT DOCUMENTS

| | | | |
|---|---|---|---|
| 3,454,510 A | 7/1969 | Newland | |
| 3,497,571 A | 2/1970 | Tellier et al. | |
| 3,536,687 A | 10/1970 | Nordstrom | 260/89.5 |
| 4,134,927 A | 1/1979 | Tomoshige | |
| 4,396,730 A | 8/1983 | Imahashi | |
| 4,415,710 A | 11/1983 | Barnabeo et al. | |
| 4,524,201 A | 6/1985 | Barnabeo et al. | |
| 4,775,593 A | 10/1988 | Heberger | |
| 4,908,151 A * | 3/1990 | Inoue et al. | 252/188.28 |
| 4,983,651 A * | 1/1991 | Griffin | 524/47 |
| 5,116,916 A | 5/1992 | Young | |
| 5,211,875 A | 5/1993 | Speer et al. | 252/188.28 |
| 5,306,760 A | 4/1994 | Sullivan | |
| 5,346,644 A | 9/1994 | Speer et al. | 252/188.28 |
| 5,393,831 A * | 2/1995 | Hudson | 525/55 |
| 5,399,289 A * | 3/1995 | Speer et al. | 252/188.28 |
| 5,425,896 A | 6/1995 | Speer et al. | 252/188.28 |
| 5,466,756 A | 11/1995 | Roach et al. | |
| 5,498,364 A | 3/1996 | Speer et al. | 252/188.28 |
| 5,627,239 A | 5/1997 | Ching et al. | 525/330.6 |
| 5,641,825 A | 6/1997 | Bacskai et al. | 524/398 |
| 5,656,692 A | 8/1997 | Hayes | 525/63 |
| 5,660,761 A | 8/1997 | Katsumoto et al. | 252/188.28 |
| 5,700,554 A | 12/1997 | Speer et al. | 428/220 |
| 5,736,616 A | 4/1998 | Ching et al. | 525/330.3 |
| 5,776,361 A | 7/1998 | Katsumoto et al. | 252/188.28 |
| 5,811,027 A | 9/1998 | Speer et al. | 252/188.28 |
| 5,837,158 A | 11/1998 | Shepodd et al. | |
| 5,859,145 A | 1/1999 | Ching et al. | 525/330.6 |
| RE36,234 E | 6/1999 | Koskan et al. | |
| 5,942,297 A * | 8/1999 | Speer et al. | 428/35.4 |
| 5,955,524 A | 9/1999 | Azuma et al. | |
| 5,981,676 A | 11/1999 | Gauthier et al. | |
| 6,057,013 A | 5/2000 | Ching et al. | 428/35.7 |
| 6,063,307 A | 5/2000 | Shepold et al. | |
| 6,083,585 A | 7/2000 | Cahill et al. | |
| 6,248,258 B1 * | 6/2001 | Tomita et al. | 252/188.28 |
| 6,313,193 B1 | 11/2001 | Simendinger | |
| 6,437,086 B1 | 8/2002 | Ching et al. | |
| 6,664,320 B1 | 12/2003 | Cai et al. | |
| 6,818,151 B1 * | 11/2004 | Yang et al. | 252/188.28 |
| 2002/0081358 A1 | 6/2002 | Galland et al. | |
| 2002/0153512 A1 * | 10/2002 | Himeshima et al. | 252/400.1 |
| 2003/0153644 A1 | 8/2003 | Yang et al. | |

FOREIGN PATENT DOCUMENTS

| | | |
|---|---|---|
| EP | 0 059 883 | 9/1982 |
| EP | 0 507 207 | 10/1992 |
| EP | 0 520 257 | 12/1992 |
| GB | 1 232 194 | 5/1971 |
| JP | 56136347 | 10/1981 |
| JP | 62177067 | 8/1987 |
| WO | WO 95/02616 | 1/1995 |
| WO | WO 96/40799 | 12/1996 |
| WO | WO97/32722 | 9/1997 |
| WO | WO 97/32925 | 9/1997 |
| WO | WO 98/06779 | 2/1998 |
| WO | WO98/51758 | 11/1998 |
| WO | WO99/38914 | 8/1999 |
| WO | WO99/48963 | 9/1999 |
| WO | WO 00/11972 | 3/2000 |
| WO | WO 03/053171 | 7/2003 |

OTHER PUBLICATIONS

Ching et al., "Tasteless Oxygen Scavenging Polymers: A New Platform Technology for Food Packaging Based On Controlled Oxidation," *Oxygen Absorber . . . 2001 and Beyond*, OSP Conference, pp. 1-8 (Chicago, Jun. 19-20, 2000).

Ching et al., "Tasteless Oxygen Scavenging Polymers: A New Platform Technology for Food Packaging Based On Controlled Oxidation," *Oxygen Absorber . . . 2001 and Beyond*, OSP Conference Slides (Chicago, Jun. 19-20, 2000).

International Search Report, PCT/US01/02034, Jun. 5, 2001, 4 pages.

Written Opinion, PCT/US01/02034, Dec. 10, 2001, 5 pages.

International Preliminary Examination Report, PCT/US01/02034, Apr. 22, 2002, 5 pages.

International Search Report, PCT/US01/28412, Mar. 18, 2002, 5 pages.

(Continued)

*Primary Examiner*—Matthew A. Thexton

(57) ABSTRACT

Disclosed herein are oxygen scavenging compositions and packaging articles that comprise (a) a metal catalyzed oxidizable compound and (b) at least one of a transition metal carboxylate, wherein the transition metal carboxylate comprises at least one carboxylate group and wherein each carboxylate group comprises between 20 and 30 carbon atoms, inclusive, such as cobalt behenate or cobalt arachidate.

37 Claims, No Drawings

OTHER PUBLICATIONS

Written Opinion, PCT/US01/28412, May 27, 2002, 2 pages.
Response to Written Opinion, PCT/US01/28412, Jul. 18, 2002, 12 pages.
International Preliminary Examination Report, PCT/US01/28412, Nov. 27, 2002, 15 pages.
International Search Report, PCT/US 01/31968, Jan. 31, 2002, 6 pages.
First Written Opinion, PCT/US 01/31968, Jun. 24, 2002, 2 pages.
Second Written Opinion, PCT/US 01/31968, Jun. 25, 2002, 7 pages.
Response to Written Opinions, PCT/US 01/31968, Sep. 3, 2002, 2 pages.
Third Written Opinion, PCT/US 01/31968, Oct. 2, 2002, 6 pages.
International Preliminary Examination Report, PCT/US 01/31968, Feb. 28, 2003, 6 pages.
International Search Report, PCT/US2004/032910, Feb. 8, 2005, 3 pages.
Written Opinion, PCT/US2004/032910, Feb. 8, 2005, 5 pages.

* cited by examiner

TRANSITION METAL CARBOXYLATES AS CATALYSTS FOR OXYGEN SCAVENGING

BACKGROUND OF THE INVENTION

The present invention relates generally to the field of oxygen scavenging packaging. In particular it relates to oxygen scavenging compositions in which oxygen scavenging is catalyzed by certain transition metal carboxylates.

It is known that limiting the exposure of oxygen-sensitive products to oxygen can maintain and enhance the quality and shelf-life of the products. One technique for limiting oxygen exposure involves incorporating an oxygen scavenger into the packaging structure for a product. Incorporation of a scavenger in the package can allow for removal of (a) oxygen present in the interior when product is filled into the package, or (b) oxygen that migrates into the package after product is filled into the package, thereby maintaining a low level of oxygen throughout the package.

In many cases, however, the onset of oxygen scavenging in this system does not occur for days or weeks. In addition, the rate of oxygen scavenging can also be relatively low. The onset of oxygen scavenging can be accelerated and the rate at which it occurs can be increased by the use of transition metal salts with organic counterions as catalysts for oxygen scavenging in a packaging article. These metal salts can be used in multilayer-film packaging applications in either an oxygen scavenging layer or a layer adjacent to an oxygen scavenging layer. However, oxygen scavenging packaging comprising transition metal catalysts having certain organic counterions, such as cobalt oleate and cobalt stearate, can have negative organoleptic effects on packaged oxygen-sensitive materials. In particular, taste and odor problems sometimes occur. Though not to be bound by theory, these organoleptic problems may be caused by the breakdown of the organic counterions (e.g., oleate and stearate).

SUMMARY OF THE INVENTION

Certain embodiments of the present invention are directed to oxygen scavenging compositions that comprise (1) at least one metal catalyzed oxidizable organic compound and (2) at least one transition metal carboxylate, wherein the transition metal carboxylate comprises at least one carboxylate group and wherein each carboxylate group comprises between 20 and 30 carbon atoms, inclusive. In certain embodiments the compositions can comprise a mixture of transition metal carboxylates. Examples of such carboxylates are transition metal behenates (alternatively called docosanates) and transition metal arachidates (alternatively called eicosanates). The transition metal of the transition metal carboxylate can be manganese, copper, or cobalt, among others. Thus, certain oxygen scavenging compositions of the present invention can comprise cobalt behenate or cobalt arachidate.

The metal catalyzed oxidizable organic compound (e.g., oxygen scavenger) can be any organic compound having oxidizable sites known in the art, wherein the reaction between oxygen and the oxidizable sites of the organic compound can be catalyzed by a transition metal catalyst.

In certain embodiments, the metal catalyzed oxidizable organic compound of the oxygen scavenging composition can be an oxidizable polymer that comprises a polymer backbone and at least one cyclic olefinic pendant group having the formula (III):

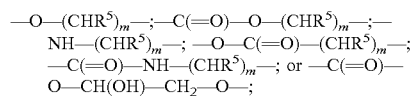

(III)

wherein X is a linking group; n is an integer from 0 to 4, inclusive; Y is $-(CR^1R^2)_a-$, wherein a is 0, 1, or 2; and Z is $-(CR^3R^4)_b-$, wherein b is 0, 1, or 2, provided that a+b is less than or equal to 3; and $q_1$, $q_2$, $q_3$, $q_4$, r, each $R^1$, each $R^2$, each $R^3$, and each $R^4$ are independently selected from hydrogen; linear, branched, cyclic, or polycyclic $C_1$–$C_{20}$ alkyl; aromatic groups; halogens; amines; or sulfur-containing substituents, provided that at least one of $q_1$, $q_2$, $q_3$, or $q_4$ is hydrogen. In certain embodiments, $q_0$, $q_1$, $q_2$, $q_3$, $q_4$, r, each $R_1$, each $R_2$, each $R_3$, and each $R_4$ are independently selected from hydrogen, methyl, or ethyl. In some embodiments, the cyclic olefinic pendant group can have the formula III, wherein a+b=1, and $q_1$, $q_2$, $q_3$, $q_4$, r, each $R^1$, each $R^2$, each $R^3$, and each $R^4$ are hydrogen (e.g., the pendant group is cyclohexenyl). In certain embodiments, the polymer backbone of the oxygen scavenging polymer is ethylenic. In certain embodiments, the oxygen scavenging polymer can be poly(ethylene/vinyl cyclohexene) (EVCH). In a further embodiment, X is a linking group involved in linking the cyclic olefinic group to the polymer backbone. The linking group can comprise:

$$-O-(CHR^5)_m-;\ -C(=O)-O-(CHR^5)_m-;\ -NH-(CHR^5)_m-;\ -O-C(=O)-(CHR^5)_m-;\ -C(=O)-NH-(CHR^5)_m-;\ or\ -C(=O)-O-CH(OH)-CH_2-O-;$$

wherein each $R^5$ is independently selected from hydrogen, methyl, ethyl, propyl, or butyl; and m is an integer from 0 to 12, inclusive.

In certain embodiments, the oxidizable polymer can be a modified vinyl alcohol polymer (mPVOH) or specifically a modified EVOH (mEVOH). A mPVOH can comprise structure VII:

(VII)

and at least one structure comprising structure IX or structure X:

(IX)

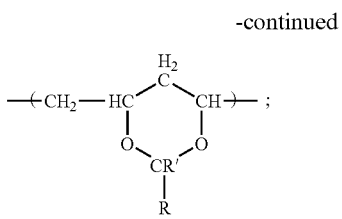
(X)

wherein —R can independently comprise an unsubstituted hydrocarbon moiety comprising at least one alpha hydrogen or a substituted hydrocarbon moiety comprising at least one alpha hydrogen, and R' can independently comprise hydrogen, an unsubstituted hydrocarbon moiety or a substituted hydrocarbon moiety.

In one embodiment, R can have structure II:

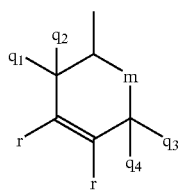
(II)

wherein $q_1$, $q_2$, $q_3$, $q_4$, and r can independently comprise hydrogen, methyl, or ethyl; m can be $—(CH_2)_n—$, wherein n can be an integer from 0 to 4, inclusive; and, when r is hydrogen, at least one of $q_1$, $q_2$, $q_3$, and $q_4$ can be hydrogen. In certain embodiments, the cycloalkenyl group can be cyclohexenyl (i.e. in structure II, n can be 1 and $q_1$, $q_2$, $q_3$, $q_4$, and r can each be hydrogen).

In certain embodiments the oxidizable polymer can be a modified EVOH comprising structures IV, V, and VI:

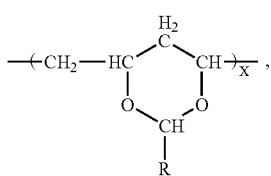
(IV)

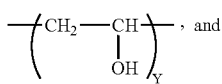, and (V)

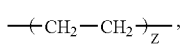
(VI)

wherein x can be an integer greater than or equal to 1, y can be an integer greater than or equal to 1, z can be an integer greater than or equal to 1, and R can be as described above (e.g., a cycloalkenyl group). In a modified ethylene vinyl alcohol polymer of the present invention, the weight fraction of the R groups relative to the polymer will typically be in the range of about 1 wt % to about 30 wt %.

In certain embodiments, the oxygen scavenging composition can further comprise at least one of a photoinitiator, an antioxidant, or a structural polymer, among others.

Certain embodiments of the present invention are directed to a packaging article comprising an oxygen scavenging layer comprising (a) at least one metal catalyzed oxidizable organic compound and (b) at least one transition metal carboxylate, wherein the transition metal carboxylate comprises at least one carboxylate group and wherein each carboxylate group comprises between 20 and 30 carbon atoms, inclusive. In certain embodiments, the oxygen scavenging layer can comprise a mixture of transition metal carboxylates, wherein the transition metal carboxylate comprises at least one carboxylate group and wherein each carboxylate group comprises between 20 and 30 carbon atoms, inclusive. The metal catalyzed oxidizable organic compound and the transition metal carboxylate are as described above. In certain embodiments the transition metal carboxylate comprises at least one organic counter-ion comprised of 20 to 30 carbon atoms having no carbon-carbon double bonds. In certain embodiments, the packaging article consists essentially of a single layer. The oxygen scavenging layer in the packaging article can further comprise at least one of a photoinitiator, an antioxidant, or a structural polymer, among others. In certain embodiments, the packaging article can further comprise at least one oxygen barrier layer or at least one structural layer. The packaging article can be in the form of a single layer film, a multilayer film, a single layer semi-rigid article, a multilayer semi-rigid article, a single layer rigid article, or a multilayer rigid article. In certain embodiments, at least one of a liner, coating, sealant, gasket, adhesive insert, non-adhesive insert, or fibrous mat insert of the packaging article comprises the oxygen scavenging layer.

Certain embodiments of the present invention are directed to an oxygen scavenging composition that comprises (a) at least one of poly(ethylene/vinyl cyclohexene) (EVCH), ethylene/methyl acrylate/cyclohexenyl methyl acrylate terpolymer (EMCM), poly(cyclohexene methyl methacrylate) (CHMA), or poly(cyclohexene methyl acrylate) (CHAA), and (b) at least one of cobalt behenate or cobalt arachidate.

Certain embodiments of the present invention are directed to packaging articles comprising an oxygen scavenging layer that comprises a metal catalyzed oxidizable polymer and at least one of cobalt behenate or cobalt arachidate.

Certain oxygen scavenging compositions of the present invention can have improved organoleptic properties when compared to compositions known in the art. In particular certain compositions of the present invention can help reduce taste and odor problems in packaged products such as foods and beverages.

DESCRIPTION OF ILLUSTRATIVE EMBODIMENTS

Certain oxygen scavenging compositions of the present invention comprise (1) at least one metal catalyzed oxidizable organic compound and (2) at least one transition metal carboxylate, wherein the transition metal carboxylate comprises at least one carboxylate group and wherein each carboxylate group comprises between 20 and 30 carbon atoms, inclusive. In certain embodiments, a composition of the present invention can comprise a mixture of two or more transition metal carboxylates.

The metal catalyzed oxidizable organic compound (e.g., oxygen scavenger) can be any organic compound having oxidizable sites known in the art, wherein the reaction between oxygen and the oxidizable sites of the organic compound can be catalyzed by a transition metal catalyst. The metal catalyzed oxidizable organic compound can, in certain embodiments, be an unsaturated organic compound. (See discussion above.)

In certain embodiments, the metal catalyzed oxidizable organic compound can be an oxidizable polymer having oxidizable sites, though the oxidizable organic compound does not have to be a polymer. In certain embodiments, the oxidizable polymer can be a diene polymer, such as polyisoprene, polybutadiene, or copolymers thereof, e.g. styrene-butadiene. The oxidizable polymer can be a polyterpene or a poly(ethylene-alkyl acrylate-benzyl acrylate), in certain embodiments. In certain embodiments, the oxidizable polymer can be poly(limonene); poly(meta-xylenediamine-adipic acid) (MXD6); poly(ethylene-methyl acrylate-benzyl acrylate) (EBZA); poly(ethylene-methyl acrylate-nopol acrylate) (EMNP): ethylene/methyl acrylate/cyclohexenyl methyl acrylate terpolymer (EMCM), poly(cyclohexene methyl methacrylate) (CHMA), or poly(cyclohexene methyl acrylate) (CHAA). Oxidizable polymers, used in certain embodiments, include polymeric compounds such as polypentenamer, polyoctenamer, and other polymers prepared by olefin metathesis; and polymers or copolymers derived from dicyclopentadiene, norbornadiene, 5-ethylidene-2-norbornene, or other monomers containing more than one carbon-carbon double bond (conjugated or non-conjugated). In certain embodiments, the carbon-carbon double bonds of such polymers can act as oxygen scavenging moieties. In certain embodiments, the oxidizable compound may be a condensation polymer containing carbon-carbon double bonds that can serve as oxidizable sites in the backbone. In certain embodiments, the oxidizable compound may be a condensation polymer having olefin or polyolefin segments within the backbone or pendant and/or terminal to the polymer backbone.

In some embodiments, the oxidizable polymer comprises a polymeric backbone and at least one cyclic olefinic pendant group (e.g., oxygen scavenging moiety) having the formula (III):

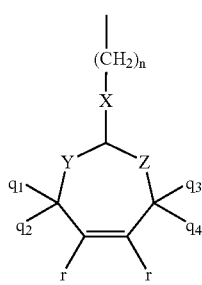

(III)

wherein X is a linking group;, wherein n is an integer from 0 to 4, inclusive; Y is —$(CR^1R^2)_a$—, wherein a is 0, 1, or 2; and Z is —$(CR^3R^4)_b$—, wherein b is 0, 1, or 2, provided that a+b is less than or equal to 3; and $q_1$, $q_2$, $q_3$, $q_4$, r, each $R^1$, each $R^2$, each $R^3$, and each $R^4$ are independently selected from hydrogen; linear, branched, cyclic, or polycyclic $C_1$–$C_{20}$ alkyl; aromatic groups; halogens; amines; or sulfur-containing substituents, provided that at least one of $q_1$, $q_2$, $q_3$, or $q_4$ is hydrogen. In certain embodiments, $q_0$, $q_1$, $q_2$, $q_3$, $q_4$, r, each $R^1$, each $R_2$, each $R_3$, and each $R^4$ are independently selected from hydrogen, methyl, or ethyl. In certain embodiments, the cyclic olefinic pendant group has the formula III, wherein a+b=1, and $q_1$, $q_2$, $q_3$, $q_4$, r, each $R^1$, each $R^2$, each $R^3$, and each $R^4$ are hydrogen (e.g., the pendant group is cyclohexenyl). The oxidizable polymer can, in certain embodiments, comprise either an ethylenic or a polyester polymeric backbone and at least one cyclic olefinic pendant group (e.g. having formula III), as either a terminal pendant group or a side pendant group. In certain embodiments, wherein the oxidizable polymer comprises at least one cyclic olefinic pendant group (e.g., oxygen scavenging moiety) the polymeric backbone comprises a substantially saturated hydrocarbon polymeric backbone. The polymeric backbone can comprise monomers of ethylene or styrene. A substantially saturated hydrocarbon backbone comprises no more than about 0.1% carbon-carbon double bonds, and in some embodiments, it comprises less than about 0.01%. In certain embodiments, the hydrocarbon backbone can be 100% saturated. The oxidizable polymer can, in certain embodiments, be ethylene/vinyl cyclohexene copolymer (EVCH).

In certain embodiments, X comprises:

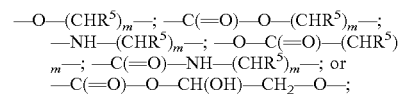

wherein each $R^5$ is independently selected from hydrogen, methyl, ethyl, propyl, or butyl; and m is an integer from 0 to 12, inclusive. In certain embodiments, the oxidizable polymer can be ethylene/methyl acrylate/cyclohexenyl methyl acrylate terpolymer (EMCM), poly(cyclohexene methyl methacrylate) (CHMA), or poly(cyclohexene methyl acrylate) (CHAA).

In certain embodiments, the oxidizable polymer can be a modified vinyl alcohol polymer (mPVOH) or specifically a modified EVOH (mEVOH). A mPVOH can comprise structure VII:

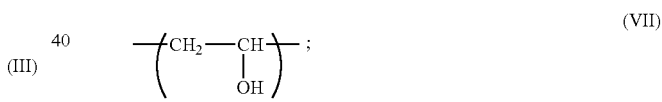

(VII)

and at least one structure comprising structure IX or structure X:

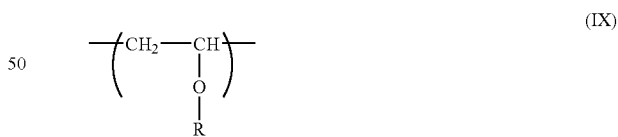

(IX)

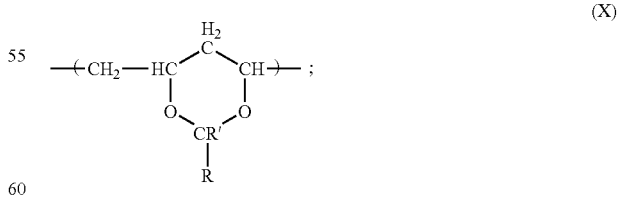

(X)

wherein —R can independently comprise an unsubstituted hydrocarbon moiety comprising at least one alpha hydrogen or a substituted hydrocarbon moiety comprising at least one alpha hydrogen, and R' can independently comprise hydrogen, an unsubstituted hydrocarbon moiety or a substituted hydrocarbon moiety.

In one embodiment, R can have structure II:

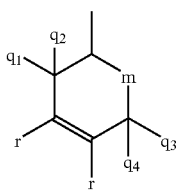

(II)

wherein $q_1$, $q_2$, $q_3$, $q_4$, and r can independently comprise hydrogen, methyl, or ethyl; m can be —$(CH_2)_n$—, wherein n can be an integer from 0 to 4, inclusive; and, when r is hydrogen, at least one of $q_1$, $q_2$, $q_3$, and $q_4$ can be hydrogen. In certain embodiments, the cycloalkenyl group can be cyclohexenyl (i.e. in structure II, n can be 1 and $q_1$, $q_2$, $q_3$, $q_4$, and r can each be hydrogen).

In certain embodiments the oxidizable polymer can be a modified EVOH comprising structures IV, V, and VI:

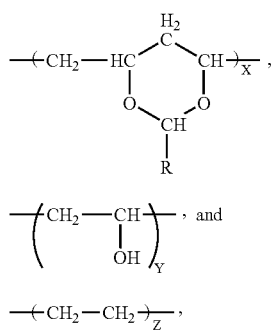

wherein x can be an integer greater than or equal to 1, y can be an integer greater than or equal to 1, z can be an integer greater than or equal to 1, and R can be as described above (e.g., a cycloalkenyl group). In a modified ethylene vinyl alcohol polymer of the present invention, the weight fraction of the R groups relative to the polymer will typically be in the range of about 1 wt % to about 30 wt %.

As stated above, certain embodiments of the present invention are directed to oxygen scavenging compositions that comprise at least one metal catalyzed oxidizable organic compound and at least one transition metal carboxylate, wherein the transition metal carboxylate comprises at least one carboxylate group and wherein each carboxylate group comprises between 20 and 30 carbon atoms, inclusive. The transition metal carboxylate (e.g., transition metal catalyst) functions to catalyze oxygen scavenging by the oxygen scavenging moieties (e.g., oxidizable sites) of the oxidizable organic compound, increasing the rate of scavenging and reducing the induction period.

Though not to be bound by theory, useful transition metals for transition metal carboxylates of the present invention include those, which can readily interconvert between at least two oxidation states. See Sheldon, R. A.; Kochi, J. K.; "Metal-Catalyzed Oxidations of Organic Compounds" Academic Press, New York 1981.

The transition metal of the transition metal carboxylate of the present invention can, in some embodiments, be selected from the first, second or third transition series of the Periodic Table. Suitable metals include, but are not limited to, manganese, iron, cobalt, nickel, copper, rhodium, and ruthenium. In some embodiments, the metal of the transition metal carboxylate can be manganese, cobalt or copper. Cobalt can be the transition metal, in certain embodiments. The oxidation state of the metal when introduced need not necessarily be that of the active form. In certain embodiments, the transition metal carboxylate, exhibits substantially no migration from the packaging article to the product (i.e., less than about 500 ppb, and in certain embodiments, less than about 50 ppb, is observed in the product).

The transition metal carboxylate used in oxygen scavenging compositions of the present invention has at least one carboxylate group and each carboxylate group comprises between 20 and 30 carbon atoms, inclusive. In some embodiments, the compositions of the present invention comprise carboxylate groups having 20 to 26 carbon atoms, and in certain embodiments, the carboxylate groups have 20 to 22 carbon atoms. In some embodiments, the carboxylate groups have an even number of carbon atoms. The transition metal carboxylate is saturated, in certain embodiments.

Suitable transition metal behenates are commercially available from Shepherd Chemical Company, Cincinnati, Ohio. Certain $C_{20}$ through $C_{30}$ carboxylates can be synthesized by reacting a $C_{20}$ through $C_{30}$ carboxylic acid, or a mixture of $C_{20}$ through $C_{30}$ carboxylic acids, with a transition metal hydroxide. For example, one suitable procedure for synthesizing behenates or arachidates involves reacting about two moles of arachidic acid or behenic acid with about one mole of transition metal hydroxide (e.g., cobalt hydroxide). About 0.9 wt % of an antioxidant, such as Irganox 1076, can be added to the acid and hydroxide before they are reacted. The reaction can, in certain embodiments, be conducted with heating and in an environment that excludes oxygen. Thus, the reaction can be performed under a nitrogen blanket or with purging. Water is produced as a by-product, and can be removed with heat and vacuum as the reaction proceeds to completion. The molten salt product (e.g., cobalt arachidate) can be discharged onto a conveyer belt, and optionally cooled with liquid nitrogen.

In certain embodiments, the transition metal carboxylate can be part of a masterbatch composition comprising a first polymer. In some embodiments, the first polymer can be an inert carrier resin such as poly(ethylene methyl acrylate) (EMAC), ethylene/butyl acrylate copolymer (EBAC), ethylene/vinyl acetate copolymer (EVA), polyethylene (PE), or mixtures thereof. In other embodiments, the first polymer can be an active oxygen scavenging carrier resin such as ethylene/methyl acrylate/cyclohexenyl methyl acrylate terpolymer (EMCM). By "inert carrier resin" is meant a polymeric organic compound that does not substantially react with oxygen. Such inert carrier resins are thermoplastic and render the composition more adaptable for processing into a packaging article. Blends of different inert carrier resins can also be used. However, the selection of the inert carrier resin largely depends on the article to be manufactured and the end use thereof. Such selection factors are well known in the art. For instance, the clarity, cleanliness, oxygen scavenging effectiveness, barrier properties, mechanical properties, or texture of the article can be adversely affected by a blend containing an inert carrier resin which is incompatible with other polymers in the blend.

As stated above, a transition metal carboxylate having at least one carboxylate group which comprises between 20 and 30 carbon atoms, inclusive and a first polymer can be components of a masterbatch. In certain embodiments, the transition metal carboxylate can be combined with a first polymer that is an active oxygen scavenging carrier resin.

By "active oxygen scavenging carrier resin" is meant a hydrocarbon with a polymeric backbone whose oxidizable sites react irreversibly with oxygen. The active carrier can be an oxidizable polymer as described above. In certain embodiments, the active oxygen scavenging carrier comprises a polymeric backbone, cyclic olefinic pendant groups, and linking groups linking the backbone with the pendant groups. In certain embodiments, the active carrier yields substantially no fragments upon oxidation that are capable of migrating out of the masterbatch composition. In certain embodiments, the masterbatch can comprise an inert and an active carrier resin mixture as the first polymer. In certain embodiments, the masterbatch can comprise a non-polymeric oxidizable compound in addition to the transition metal carboxylate and the first polymer, as described above.

As an example of a masterbatch, a transition metal carboxylate having at least one carboxylate group, which comprises between 20 and 30 carbon atoms, inclusive (e.g., behenate or arachidate) can be solvent coated onto the pellets comprising the first polymer; and a second polymer or a photoinitiator (see description below), in powder form, can be dispersed on the exteriors of the pellets. Such a masterbatch composition can be prepared by a method comprising (i) providing a solution of transition metal carboxylate (e.g., arachidate or behenate) in an organic solvent; (ii) dispersing the solution onto the pellets to form coated pellets; (iii) evaporating the solvent from the coated pellets to form transition metal carboxylate dispersed on the pellets; and (iv) mixing the second polymer or the photoinitiator, in powder form, with the pellets, to form the masterbatch.

In another embodiment, the masterbatch composition comprises the transition metal carboxylate having at least one carboxylate group, which comprises between 20 and 30 carbon atoms, inclusive and a first polymer as described above (e.g., EMAC or EMCM), wherein the first polymer is in the form of a pellet and the transition metal carboxylate is in the form of powder dispersed on the exterior of the pellets. Such a masterbatch composition can be prepared by a method comprising (i) providing the first polymer in the form of pellets, and (ii) dispersing the transition metal carboxylate (e.g. behenate or arachidate) in the form of a powder on the exterior of the pellets.

In yet another embodiment, the masterbatch composition comprises the transition metal carboxylate (e.g., transition metal behenate or arachidate) and a first polymer, wherein the transition metal carboxylate and the first polymer are compounded. Such a masterbatch can be prepared by a method comprising (i) providing the transition metal carboxylate in the form of a solid and providing the polymer as pellets and (ii) compounding the transition metal carboxylate and the polymer. A masterbatch comprising transition metal carboxylate and a first polymer can be further compounded with a photoinitiator or other compounds, as described below.

Typically, the amount of transition metal in the masterbatch can range from about 0.01% to about 5.0% by weight of the total masterbatch, based on the metal content only (excluding counterions). In certain embodiments, the amount of transition metal in the masterbatch ranges from about 0.1% to about 2.0%. In other embodiments the amount of transition metal in the masterbatch ranges from about 1.0% to about 2.0%. In the event the amount of transition metal carboxylate is less than 1%, it follows that the first polymer, and any additive (e.g., photoinitiator, antioxidant, or other compounds useful in oxygen scavenging packaging articles), will comprise substantially all of the masterbatch, i.e. more than 99%.

In certain embodiments, the composition or layer comprising the transition metal carboxylate masterbatch can comprise at least one of additional polymers, antioxidants, photoinitiators, or other compounds useful in oxygen scavenging packaging. Thus, for example, a cobalt behenate masterbatch comprising cobalt behenate, poly(ethylene methyl acrylate) (EMAC), and photoinitiator can be compounded with ethylene/methyl acrylate/cyclohexenyl methyl acrylate terpolymer (EMCM), and the compounded material can be formed into an oxygen scavenging layer.

Because compositions of the present invention are useful in oxygen scavenging, compounds known for use with metal catalyzed oxidizable organic compounds can be added to enhance the oxygen scavenging functionality of the composition in storage, processing into a layer of a packaging article, or use of the packaging article. Such enhancements include, but are not limited to, limiting the rate of oxygen scavenging prior to filling of the packaging article with a product, initiating oxygen scavenging at a desired time, or limiting the induction period (the period between initiating oxygen scavenging and scavenging of oxygen at a desired rate), among others.

A compound that can optionally be added to the oxygen scavenging composition is a photoinitiator, or a blend of different photoinitiators, especially if antioxidants are included to prevent premature oxidation of the oxygen scavenging moieties of the composition. In certain embodiments, the photoinitiator can be introduced into the oxygen scavenging composition using a masterbatch that comprises it.

Use of a photoinitiator can, in certain embodiments, provide faster and more efficient initiation of oxygen scavenging by the metal catalyzed oxidizable organic compound, but its use is optional. Due to the cost of photoinitiators, it is desirable to use the minimum amount of photoinitiator required to initiate oxygen scavenging. This minimum amount will vary depending on the photoinitiator used, the wavelength and intensity of ultraviolet light used to initiate, and other factors. In some embodiments, the photoinitiator can be either on the U.S. Food and Drug Administration GRAS (generally regarded as safe) list, or exhibits substantially no migration from the packaging article to the product (e.g., less than 50 ppb in the edible dietary intake (EDI)).

Suitable photoinitiators are well known to those skilled in the art. Specific examples include, but are not limited to, benzophenone, o-methoxybenzophenone, acetophenone, o-methoxy-acetophenone, acenaphthenequinone, methyl ethyl ketone, valerophenone, hexanophenone, α-phenyl-butyrophenone, p-morpholinopropiophenone, dibenzosuberone, 4-morpholinobenzophenone, benzoin, benzoin methyl ether, 4-o-morpholinodeoxybenzoin, p-diacetylbenzene, 4-aminobenzophenone, 4'-methoxyacetophenone, α-tetralone, 9-acetylphenanthrene, 2-acetylphenanthrene, 10-thioxanthenone, 3-acetylphenanthrene, 3-acetylindole, 9-fluorenone, 1-indanone, 1,3,5-triacetylbenzene, thioxanthen-9-one, xanthene-9-one, 7-H-benz[de]anthracen-7-one, benzoin tetrahydropyranyl ether, 4,4'-bis(dimethylamino)-benzophenone, 1'-acetonaphthone, 2'-acetonaphthone, acetonaphthone and 2,3-butanedione, benz[a]anthracene-7,12-dione, 2,2-dimethoxy-2-phenylacetophenone, α,α-diethoxyacetophenone, and α,α-dibutoxyacetophenone, among others. Singlet oxygen generating photosensitizers such as Rose Bengal, methylene blue, and tetraphenyl porphine can also be employed as photoinitiators. Polymeric initiators include poly(ethylene carbon monoxide) and oligo [2-hydroxy-2-methyl-1-[4-(1-methylvinyl)phenyl]propanone].

Photoinitiators that are especially useful in the present invention include benzophenone derivatives containing at least two benzophenone moieties, as described in U.S. Pat. No. 6,139,770. These compounds act as effective photoinitiators to initiate oxygen scavenging activity in oxygen scavenging compositions. Such benzophenone derivatives have a very low degree of extraction, which can lead to reduced malodor or off-taste of a packaged food, beverage, or oral pharmaceutical product by extracted photoinitiator.

A "benzophenone moiety" is a substituted or unsubstituted benzophenone group. Suitable substituents include alkyl, aryl, alkoxy, phenoxy, and alicylic groups contain from 1 to 24 carbon atoms or halides.

The benzophenone derivatives include dimers, trimers, tetramers, and oligomers of benzophenones and substituted benzophenones.

The benzophenone photoinitiators are represented by the formula:

$$A_s(B)_t$$

wherein A is a bridging group selected from sulfur; oxygen; carbonyl; —SiR'$_2$—, wherein each R' is individually selected from alkyl groups containing from 1 to 12 carbon atoms, aryl groups containing 6 to 12 carbon atoms, or alkoxy groups containing from 1 to 12 carbon atoms; —NR"—, wherein R" is an alkyl group containing 1 to 12 carbon atoms, an aryl group containing 6 to 12 carbon atoms, or hydrogen; or an organic group containing from 1 to 50 carbon atoms; s is an integer from 0 to 11; B is a substituted or unsubstituted benzophenone group; and t is an integer from 2 to 12.

The bridging group A can be a divalent group, or a polyvalent group with 3 or more benzophenone moieties. The organic group, when present, can be linear, branched, cyclic (including fused or separate cyclic groups), or an arylene group (which can be a fused or non-fused polyaryl group). The organic group can contain one or more heteroatoms, such as oxygen, nitrogen, phosphorous, silicon, or sulfur, or combinations thereof. Oxygen can be present as an ether, ketone, ester, or alcohol.

The substituents of B, when present, are individually selected from alkyl, aryl, alkoxy, phenoxy, or alicylic groups containing from 1 to 24 carbon atoms, or halides. Each benzophenone moiety can have from 0 to 9 substituents. Substituents can be selected to render the photoinitiator more compatible with the oxygen scavenging composition.

Examples of such benzophenone derivatives comprising two or more benzophenone moieties include dibenzoyl biphenyl, substituted dibenzoyl biphenyl, benzoylated terphenyl, substituted benzoylated terphenyl, tribenzoyl triphenylbenzene, substituted tribenzoyl triphenylbenzene, benzoylated styrene oligomer (a mixture of compounds containing from 2 to 12 repeating styrenic groups, comprising dibenzoylated 1,1-diphenyl ethane, dibenzoylated 1,3-diphenyl propane, dibenzoylated 1-phenyl naphthalene, dibenzoylated styrene dimer, dibenzoylated styrene trimer, and tribenzoylated styrene trimer), and substituted benzoylated styrene oligomer.

When a photoinitiator is used, its primary function is to enhance and facilitate the initiation of oxygen scavenging by the oxygen scavenging moieties of the metal catalyzed oxidizable organic compound upon exposure to radiation. The amount of photoinitiator can vary. In many instances, the amount will depend on the metal catalyzed oxidizable organic compound used, the wavelength and intensity of UV radiation used, the nature and amount of antioxidants used, as well as the type of photoinitiator used. The amount of photoinitiator also depends on the intended use of the oxygen scavenging composition. For instance, if the photoinitiator-containing component is placed underneath a layer, which is somewhat opaque to the radiation used, more initiator can be needed. For most purposes, however, the amount of photoinitiator, when used, will be in the range of 0.01 to 10% by weight of the total oxygen scavenging composition. In certain embodiments, the amount of photoinitiator will be in the range of about 0.01 and 5 wt % based on the total weight of the oxygen scavenging composition Alternatively, an oxygen scavenging composition of the present invention can be heated to an extent sufficient to initiate oxygen scavenging. Such initiation using heat can be performed for up to about 60 minutes, and in certain embodiments, between about 0.1 minutes and 45 minutes. In some embodiments the heat initiation can be performed between about 0.1 and 30 minutes; in some between about 0.1 and 15 minutes; in some between about 0.1 and 5 minutes; and in some between 0.1 and 1 minute. Initiation of oxygen scavenging using heat can take place during the process of forming the oxygen scavenging composition itself, during the process of preparing the oxygen scavenging composition into a packaging article (e.g., preforms or polymer blends), or film, or it can take place after the oxygen scavenging composition has been formed into a packaging article.

Heat sources for heat triggering can be elected from those known in the art. For example, hot air can be blown on the oxygen scavenging composition or infrared radiation can be used to heat the oxygen scavenging composition. The heat triggering can be performed under nitrogen or in a low oxygen atmosphere, in which the oxygen concentration is lower than in air. Regardless of when the oxygen scavenging composition is heated (e.g., during or after the formation of a packaging article or film) the oxygen scavenging composition can be heated to a temperature sufficient to trigger oxygen scavenging. In certain embodiments, mixing temperature and time are carefully controlled to obtain a blend of metal catalyzed oxidizable organic compound and transition metal carboxylate having at least one carboxylate group which comprises between 20 and 30 carbon atoms, inclusive that is not triggered until processing that occurs after mixing. The temperature of the heating apparatus and the duration of exposure that is sufficient for heat triggering will vary depending on the oxygen scavenging composition, the metal catalyzed oxidizable organic compound, the presence and quantity of transition metal carboxylates, antioxidants, and other additives in the composition, the design of the heating apparatus, the proximity of the oxygen scavenging composition to the heat source, the nature of heat transfer (typically convection), and other parameters apparent to one of ordinary skill in the art.

In certain embodiments, in which heat is used to initiate oxygen scavenging the oxygen scavenging composition does not comprise a photoinitiator, though this is not intended to imply that oxygen scavenging compositions that comprise photoinitiators could not be used in the heat triggering methods of the present invention. Thus, certain oxygen scavenging compositions of the present invention do not require UV radiation exposure to initiate oxygen scavenging.

In some embodiments initiation of oxygen scavenging in a packaging article comprising a composition of the present invention can involve (i) providing the packaging article comprising an oxidizable compound; (ii) wetting the surface of the packaging article with a solution comprising a peroxide; and (iii) exposing the wetted surface to an initiating factor, to initiate oxygen scavenging by the packaging article. Typically, the initiating factor is ultraviolet light, heat, or both. Such methods have been described in the publication U.S. 20020081358 (application Ser. No. 09/748,529), which is incorporated herein by reference.

As discussed above, antioxidants can be used in the composition to control scavenging initiation by the oxygen scavenging moieties (e.g., oxidizable sites) of the metal catalyzed oxidizable organic compound. An antioxidant as defined herein is a material, which inhibits oxidative degradation or cross-linking of polymers. Typically, antioxidants are added to facilitate the processing of polymeric materials or prolong their useful lifetime. In certain embodiments, the antioxidant can be introduced into an oxygen scavenging composition using a masterbatch that comprises it. In relation to this invention, such additives prolong the induction period for oxygen scavenging in the absence of irradiation or heat initiation. When it is desired to commence oxygen scavenging by the oxygen scavenging moieties of the metal catalyzed oxidizable organic compound in the oxygen scavenging composition, the oxygen scavenging composition or an article comprising it can be exposed to radiation or heat.

Antioxidants such as 2,6-di(t-butyl)-4-methylphenol (BHT), 2,2'-methylene-bis(6-t-butyl-p-cresol), triphenylphosphite, tris-(nonylphenyl)phosphite, vitamin E, tetra-bismethylene 3-(3,5-ditertbutyl-4-hydroxyphenyl)-propionate methane, and dilaurylthiodipropionate are suitable for use with this invention.

The amount of an antioxidant present can also have an effect on the rate of oxygen scavenging by the oxygen scavenging moieties of the oxygen scavenging composition. As mentioned earlier, antioxidants are usually present in compositions comprising an oxidizable polymer or a structural polymer to prevent oxidation or gelation of the polymers. Typically, they are present in about 50 to 3000 ppm of the composition. However, additional amounts of antioxidant can also be added if it is desired to increase the induction period as described above.

The oxygen scavenging composition can comprise film-forming structural polymers. Such polymers are thermoplastic or thermosetting and render an oxygen scavenging layer more adaptable for use in a packaging article. Suitable structural polymers include, but are not limited to, polypropylene (PP), polystyrene (PS), polyethylene (PE), low density polyethylene, linear low density polyethylene, ultra-low density polyethylene, high density polyethylene, polyethylene terephthalate (PET), polyvinyl chloride, and ethylene copolymers such as ethylene-vinyl acetate, ethylene-alkyl (meth)acrylates, ethylene-(meth)acrylic acid and ethylene-(meth)acrylic acid ionomers. In rigid articles, such as beverage containers, PET, PP, or PS are often used. Blends of different structural polymers can also be used. However, the selection of the structural polymer largely depends on the article to be manufactured and the end use thereof. Such selection factors are well known in the art. For instance, the clarity, cleanliness, effectiveness as an oxygen scavenger, barrier properties, mechanical properties, or texture of the article can be adversely affected by a blend containing a structural polymer which is incompatible with the metal catalyzed oxidizable organic compound.

When one or more structural polymers are used, those polymers can comprise, in total, as much as 99% by weight of an oxygen scavenging composition or an oxygen scavenging layer. In certain embodiments, an oxygen scavenging composition comprising a structural polymer will comprise between about 10 and 95 wt % of the structural polymer. In other embodiments an oxygen scavenging composition comprising a structural polymer will comprise between about 10 and 75 wt % of the structural polymer.

Additives which can be included in the oxygen scavenging composition include, but are not necessarily limited to, antioxidants, co-catalysts, additional polymers, pigments, fillers, pigments, dyestuffs, stabilizers, processing aids, plasticizers, fire retardants, and anti-fog agents, among others. In certain embodiments, the oxygen scavenging composition will not comprise more than about 10% additives by weight, and in other embodiments it will not comprise more than about 5% additives by weight. In certain embodiments, the additives can be introduced into the oxygen scavenging composition using a masterbatch that comprises them.

Packaging articles typically come in several forms including a single layer film, a multilayer film, a single layer semi-rigid article, a multilayer semi-rigid article, a single layer rigid article, or a multilayer rigid article. Typical rigid or semirigid articles include plastic, paper or cardboard cartons or bottles such as juice containers, soft drink containers, thermoformed trays, or cups, which have wall thicknesses in the range of 100 to 1000 micrometers. Typical flexible bags include those used to package many food items, and will likely have thicknesses of 5 to 250 micrometers. The walls of such articles comprise either single or multiple layers of material.

In some embodiments the metal catalyzed oxidizable organic compound and the transition metal carboxylate are both included in the oxygen scavenging layer of a packaging article, and the layer can optionally include other compounds such as a photoinitiator, an antioxidant, a structural polymer, or additives, as described above. In some multilayer packaging articles, one layer can comprise the metal catalyzed oxidizable organic compound and another adjacent layer can comprise the transition metal carboxylate having at least one carboxylate group, which comprises between 20 and 30 carbon atoms, inclusive. Thus, certain embodiments of the present invention are directed to packaging articles comprising an oxygen scavenging layer comprising at least one metal catalyzed oxidizable organic compound, and a second layer adjacent to the oxygen scavenging layer comprising at least one transition metal carboxylate, wherein the transition metal carboxylate comprises at least one carboxylate group and wherein each carboxylate group comprises between 20 and 30 carbon atoms, inclusive. In certain embodiments, transition metal carboxylate is cobalt behenate or cobalt arachidate.

In certain embodiments additional layers of a multilayer packaging article can comprise a structural layer or layers, an oxygen barrier layer or layers, or a combination thereof, among others.

In a structural layer, suitable structural polymers include, but are not limited to, polyethylene, low density polyethylene, very low density polyethylene, ultra-low density polyethylene, high density polyethylene, polypropylene, poly(ethylene terephthalate) (PET), poly(ethylene naphthalate) (PEN), ethylene-vinyl acetate, ethylene-alkyl (meth)acrylates, ethylene-(meth)acrylic acid, and ethylene-(meth) acrylic acid ionomers. Paperboard or cardboard can also be used as the structural component for carton applications.

The additional layers of a multilayer material can further comprise at least one oxygen barrier layer, i.e. a layer having an oxygen transmission rate equal to or less than 50 cubic centimeters per square meter ($cc/m^2$) per day per atmosphere at room temperature (about 25° C.). Typical oxygen barriers can comprise polyethylene naphthalate, ethylene/vinyl acetate copolymer, ethylene/styrene copolymer, poly(ethylene vinyl alcohol), polyacrylonitrile, polyvinyl chloride, poly(vinylidene dichloride), polyethylene terephthalate, silica, polyamides, or mixtures thereof.

Other additional layers of the packaging article can include one or more layers, which are permeable to oxygen (an "oxygen permeable layer") and are located on the interior surface of the packaging article, i.e. between the packaged product and the oxygen scavenging layer. In one packaging article that can be used for flexible packaging of food, the layers include, in order starting from the outside of the package to the innermost layer of the package, (i) an optional oxygen barrier layer, (ii) an oxygen scavenging layer comprising the metal catalyzed oxidizable organic compound and the transition metal carboxylate, and (iii) an optional oxygen-permeable layer. Control of the oxygen barrier property of (i) allows regulation of the scavenging life of the oxygen scavenging layer by limiting the rate of oxygen entry to the oxygen scavenging moieties in layer (ii), and thus slows the consumption of oxygen scavenging capacity by ingress oxygen. Control of the oxygen permeability of layer (iii) allows setting the rate of oxygen passage from the packaged product to the oxygen scavenging moieties in layer (ii). Furthermore, layer (iii) can provide a barrier to migration of the components of the oxygen scavenging layer or by-products of scavenging, into the package interior. However, if the metal catalyzed oxidizable organic compound is an oxidizable polymer that comprises a cyclic olefinic group, few, if any, scavenging byproducts capable of migrating into the package interior would be expected to be produced. Also, the transition metal carboxylate would also be expected to have negligible migration of the salt or any breakdown products into the package interior. Therefore, a migration barrier function for layer (ii) can be dispensed with, in some embodiments. Even further, layer (iii) can improve the heat-sealability, clarity, or resistance to blocking of the multilayer packaging article.

Further additional layers, such as adhesive layers, can also be used. Compositions typically used for adhesive layers include anhydride functional polyolefins and other well-known adhesive layers.

As stated above, the packaging article comprising the oxygen scavenging layer can comprise a single layer or multiple layer comprising metal catalyzed oxidizable organic compound. Single layered (e.g., layer comprises both the metal catalyzed oxidizable organic compound and the transition metal carboxylate) packaging articles of the present invention can be prepared by solvent casting, injection molding, blow molding, or extrusion. Packaging articles with multiple layers are typically prepared using coextrusion, injection molding, blow molding, coating, or lamination. A multilayer packaging article can comprise one or more oxygen scavenging layers.

The packaging article comprising the oxygen scavenging composition can be used to package any product for which it is desirable to inhibit oxygen damage during storage, e.g. foods, beverages, pharmaceuticals, medical products, corrodible metals, or electronic devices.

The following example is included to demonstrate representative embodiments of the invention. Those of skill in the art should, in light of the present disclosure, appreciate that many changes can be made in the specific embodiments which are disclosed and still obtain a like or similar result without departing from the spirit and scope of the invention.

EXAMPLE 1

Examination of Cobalt Salt Selection on Organoleptics of Oxidized Oxygen Scavenging Films Multilayer film structures were produced on a cast film line of the following structure:

0.5 mils LDPE/0.5 mils OSP™ Blend/0.5 mils LDPE

Two different core layer compositions were examined. In both samples, the core OSPTM layer was comprised of 90% ethylene methylacrylate cyclohexenyl methylacrylate ("EMCM") and 10% masterbatch (masterbatch contains 1% cobalt and 1% photoinitiator). In Sample 1, the cobalt was delivered in the form of cobalt oleate. In Sample 2, the cobalt was delivered in the form of cobalt behenate. Ethylene methyl acrylate (EMAC) served as the carrier resin for both masterbatches.

Film samples were exposed to adequate amounts of UV to trigger the scavenging reaction, formed into pouches, and filled with 500 cc of spring water. Each pouch was then placed in a large foil pouch and sealed. A 400 cc headspace of air was then established in the foil pouch.

These water samples were allowed to age for over two weeks. The pouches were then removed and drained into beaker for taste testing.

Sensory testing of water samples indicated that water stored in pouches produced with Sample 2 film exhibited improved taste and odor relative to those stored pouches produced with film Sample 1. The use of cobalt behenate salt in the formulation of masterbatch can offer an incremental improvement in organoleptics of oxidized oxygen scavenging films.

All of the compositions and methods disclosed and claimed herein can be made and executed without undue experimentation in light of the present disclosure. It will be apparent to those of skill in the art that variations may be applied to the compositions and methods and in the steps or in the sequence of steps of the methods described herein without departing from the concept, spirit and scope of the invention. More specifically, it will be apparent that certain agents, which are chemically related, may be substituted for the agents described herein while the same or similar results would be achieved. All such similar substitutes and modifications apparent to those skilled in the art are deemed to be within the spirit, scope and concept of the invention as defined by the appended claims.

What is claimed is:

1. An oxygen scavenging composition, comprising:
   at least one metal catalyzed oxidizable organic compound, and
   at least one transition metal carboxylate, wherein the transition metal carboxylate comprises a behenate or an arachidate.

2. The composition of claim 1, wherein the transition metal carboxylate comprises manganese, copper, or cobalt.

3. The composition of claim 1, wherein the transition metal carboxylate comprises cobalt.

4. The composition of claim 1, wherein the transition metal carboxylate comprises cobalt behenate.

5. The composition of claim 1, wherein the transition metal carboxylate comprises cobalt arachidate.

6. The composition of claim 1, wherein the oxidizable organic compound comprises an unsaturated organic compound.

7. The composition of claim 1, wherein the oxidizable organic compound comprises carotene, ascorbic acid, squalene, or dehydrated castor oil.

8. The composition of claim 1, wherein the oxidizable organic compound comprises an oxidizable polymer having oxidizable sites.

9. The composition of claim 8, wherein the oxidizable polymer comprises a polyterpene or a poly(ethylene-alkyl acrylate-benzyl acrylate).

10. The composition of claim 8, wherein the oxidizable polymer comprises polybutadiene; polyisoprene; poly(limonene); poly(meta-xylenediamine-adipic acid) (MXD6); poly(ethylene-methyl acrylate-benzyl acrylate) (EBZA); poly(ethylene-methyl acrylate-nopol acrylate) (EMNP): ethylene/methyl acrylate/cyclohexenyl methyl acrylate terpolymer (EMCM), poly(cyclohexene methyl methacrylate) (CHMA), or poly(cyclohexene methyl acrylate) (CHAA).

11. The composition of claim 8, wherein the oxidizable polymer comprises a polymer backbone and at least one cyclic olefinic pendant group having the formula (III):

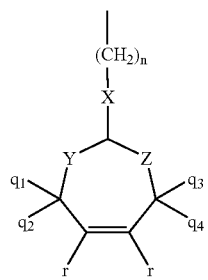

wherein X is a linking group-; wherein n is an integer from 0 to 4, inclusive; Y is $-(CR^1R^2)_a-$, wherein a is 0, 1, or 2; and Z is $-(CR^3R^4)_b-$, wherein b is 0, 1, or 2, provided that a+b is less than or equal to 3; and $q_1$, $q_2$, $q_3$, $q_4$, r, each $R^1$, each $R^2$, each $R^3$, and each $R^4$ are independently selected from hydrogen; linear, branched, cyclic, or polycyclic $C_1$-$C_{20}$ alkyl; aromatic groups; halogens; amines; or sulfur-containing substituents, provided that at least one of $q_1$, $q_2$, $q_3$, or $q_4$ is hydrogen.

12. The composition of claim 11, wherein the backbone is ethylenic.

13. The composition of claim 11, wherein the oxidizable polymer is poly(ethylene/vinyl cyclohexene) (EVCH).

14. The composition of claim 11, wherein X comprises:

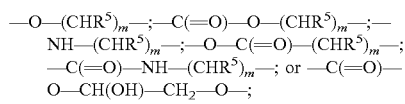

wherein each $R^5$ is independently selected from hydrogen, methyl, ethyl, propyl, or butyl; and m is an integer from 0 to 12, inclusive.

15. The composition of claim 8, wherein the oxidizable polymer comprises, structure VII

and at least one structure comprising structure IX or structure X:

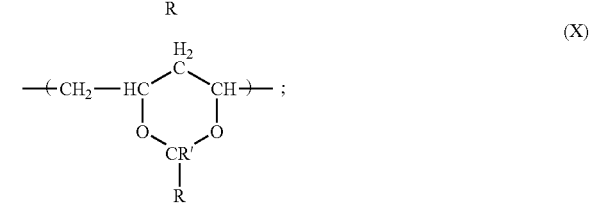

wherein —R can independently comprise an unsubstituted hydrocarbon moiety comprising at least one alpha hydrogen or a substituted hydrocarbon moiety comprising at least one alpha hydrogen, and R' can independently comprise hydrogen, an unsubstituted hydrocarbon moiety or a substituted hydrocarbon moiety.

16. A packaging article, comprising:
an oxygen scavenging layer comprising (a) at least one metal catalyzed oxidizable organic compound, and (b) at least one transition metal carboxylate, wherein the transition metal carboxylate comprises a behenate or an arachidate.

17. The packaging article of claim 16, wherein the transition metal carboxylate comprises manganese, copper, or cobalt.

18. The packaging article of claim 16, wherein the transition metal carboxylate comprises cobalt.

19. The packaging article of claim 16, wherein the transitional metal carboxylate is cobalt behenate.

20. The packaging article of claim 16, wherein the transitional metal carboxylate is cobalt arachidate.

21. The packaging article of claim 16, wherein the oxidizable organic compound comprises an unsaturated organic compound.

22. The packaging article of claim 16, wherein the oxidizable organic compound comprises an oxidizable polymer having oxidizable sites.

23. The packaging article of claim 22, wherein the oxidizable polymer comprises polybutadiene; polyisoprene; poly(limonene); poly(meta-xylenediamine-adipic acid) (MXD6); poly(ethylene-methyl acrylate-benzyl acrylate) (EBZA); poly(ethylene-methyl acrylate-nopol acrylate) (EMNP): ethylene/methyl acrylate/cyclohexenyl methyl acrylate terpolymer (EMCM), poly(cyclohexene methyl methacrylate) (CHMA), or poly(cyclohexene methyl acrylate) (CHAA).

24. The packaging article of claim 22, wherein the oxidizable polymer comprises a polymer backbone and at least one cyclic olefinic pendant group having the formula (III):

III

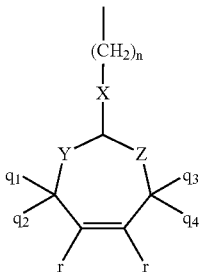

wherein X is a linking group; wherein n is an integer from 0 to 4, inclusive; Y is —$(CR^1R^2)_a$—, wherein a is 0, 1, 2; and Z is —$(CR^3R^4)_b$—, wherein b is 0, 1, or 2, provided that a+b is less than or equal to 3; and $q_1$, $q_2$, $q_3$, $q_4$, r, each $R^1$, each $R^2$, each $R^3$, and each $R^4$ are independently selected from hydrogen; linear, branched, cyclic, or polycyclic $C_1$–$C_{20}$ alkyl; aromatic groups; halogens; amines; or sulfur-containing substituents, provided that at least one of $q_1$, $q_2$, $q_3$, or $q_4$ is hydrogen.

25. The packaging article of claim 24, wherein the backbone is ethylenic.

26. The packaging article of claim 24, wherein the oxidizable polymer comprises poly(ethylene/vinyl cyclohexene) (EVCH), ethylene/methyl acrylate/cyclohexenyl methyl acrylate terpolymer (EMCM), poly(cyclohexene methyl methacrylate) (CHMA), and poly(cyclohexene methyl acrylate) (CHAA).

27. The packaging article of claim 24, wherein X comprises:

—O—$(CHR^5)_m$—; —C(=O)—O—$(CHR^5)_m$—;
—NH—$(CHR^5)_m$—; —O—C(=O)—$(CHR^5)_m$—; —C(=O)—NH—$(CHR^5)_m$—; or
—C(=O)—O—CH(OH)—CH$_2$—O—;

wherein each $R^5$ is independently selected from hydrogen, methyl, ethyl, propyl, or butyl; n is an integer from 0 to 4, inclusive; and m is an integer from 0 to 12, inclusive.

28. The packaging article of claim 22, wherein the oxidizable polymer comprises structure VII:

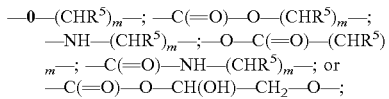

(VII)

and at least one structure comprising structure IX or structure X:

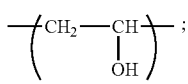

(IX)

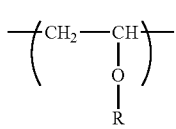

(X)

wherein —R can independently comprise an unsubstituted hydrocarbon moiety comprising at least one alpha hydrogen or a substituted hydrocarbon moiety comprising at least one alpha hydrogen, and R' can independently comprise hydrogen, an unsubstituted hydrocarbon moiety or a substituted hydrocarbon moiety.

29. The packaging article of claim 16, further comprising at least one oxygen barrier layer.

30. The packaging article of claim 29, wherein the oxygen barrier layer comprises at least one polymer comprising poly(ethylene vinyl alcohol) (EVOH), ethylene/vinyl acetate copolymer, ethylene/styrene copolymer, polyacrylonitrile, polyvinyl chloride (PVC), poly(vinylidene dichloride), polyethylene terephthalate (PET), polyethylene naphthalate, or polyamide.

31. The packaging article of claim 16, wherein the packaging article is in the form of a single layer film, a multilayer film, a single layer semi-rigid article, a multilayer semi-rigid article, a single layer rigid article, or a multilayer rigid article.

32. The packaging article of claim 16, wherein at least one of a liner, coating, sealant, gasket, adhesive insert, non-adhesive insert, or fibrous mat insert of the packaging article comprises the oxygen scavenging layer.

33. An oxygen scavenging composition, comprising:
at least one of poly(ethylene/vinyl cyclohexene) (EVCH), ethylene/methyl acrylate/cyclohexenyl methyl acrylate terpolymer (EMCM), poly(cyclohexene methyl methacrylate) (CHMA), or poly(cyclohexene methyl acrylate) (CHAA), and at least one of cobalt behenate or cobalt arachidate.

34. A packaging article, comprising:
an oxygen scavenging layer comprising (a) at least one metal catalyzed oxidizable polymer, and (b) at least one of cobalt behenate or cobalt arachidate.

35. The packaging article of claim 34, wherein the metal catalyzed oxidizable polymer comprises poly(ethylene/vinyl cyclohexene) (EVCH), ethylene/methyl acrylate/cyclohexenyl methyl acrylate terpolymer (EMCM), poly(cyclohexene methyl methacrylate) (CHMA), and poly(cyclohexene methyl acrylate) (CHAA).

36. A packaging article, comprising:
an oxygen scavenging layer comprising at least one metal catalyzed oxidizable organic compound, and
a second layer adjacent to the oxygen scavenging layer comprising at least one transition metal carboxylate, wherein the transition metal carboxylate comprises a behenate or an arachidate.

37. A packaging article, comprising:
an oxygen scavenging layer comprising at least one metal catalyzed oxidizable organic compound, and
a second layer adjacent to the oxygen scavenging layer comprising at least one of cobalt behenate or cobalt arachidate.

* * * * *